US007680655B2

(12) United States Patent
Canniff et al.

(10) Patent No.: US 7,680,655 B2
(45) Date of Patent: Mar. 16, 2010

(54) METHOD AND APPARATUS FOR MEASURING THE QUALITY OF SPEECH TRANSMISSIONS THAT USE SPEECH COMPRESSION

(75) Inventors: Ronald Jay Canniff, Naperville, IL (US); Michael R. Kosek, Naperville, IL (US); Alan Howard Matten, Chicago, IL (US); Harvey P. Siy, Chicago, IL (US); Peng Zhang, Buffalo Grove, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1155 days.

(21) Appl. No.: 11/134,188

(22) Filed: May 20, 2005

(65) Prior Publication Data

US 2006/0265211 A1 Nov. 23, 2006

(51) Int. Cl.
*G10L 15/20* (2006.01)

(52) U.S. Cl. ........................ 704/233; 704/214; 704/221; 455/423

(58) Field of Classification Search ................. 704/201, 704/216, 217, 218, 227, 228, 200, 210, 208, 704/215, 214, 233, 221; 379/28; 702/117; 455/423, 115.2

See application file for complete search history.

(56) References Cited

U.S. PATENT DOCUMENTS 4,352,182 A 9/1982 Billi et al.
5,784,406 A 7/1998 DeJaco et al.
5,890,104 A * 3/1999 Hollier ........................ 704/201
6,021,385 A 2/2000 Jarvinen et al.
6,169,763 B1 1/2001 Woodward et al.
6,389,111 B1 * 5/2002 Hollier et al. ................. 379/28
6,594,344 B2 7/2003 Masri et al.
6,606,354 B1 8/2003 Bach et al.

(Continued)

OTHER PUBLICATIONS

International Telecommunication Union, Mapping function for transforming P.862 raw result scores to MOS-LQO, Nov. 2003.

(Continued)

*Primary Examiner*—Huyen X. Vo
(74) *Attorney, Agent, or Firm*—Jenner & Block, LLP

(57) ABSTRACT

A method and apparatus are provided for determining the quality of a speech transmission, including temporal clipping, delay and jitter, using a carefully constructed test signal (300) and digital signal processing techniques. The test signal that is to be transmitted through a speech transmission system (100) is created (700). Then the test signal is transmitted through the speech transmission system such that the speech transmission system creates an output signal that corresponds to the input signal, as modified by the speech transmission system (702). The test signal includes multiple segments (500) of speech signals interleaved with periods of silence. The periods of silence vary in duration according to a predefined pattern. Each segment of speech signals includes multiple predefined speech samples or symbols (400, 402, 404, 406, 408, 410, 412, 414) interleaved with a plurality of silence gaps. The speech samples have a common period of duration, but the silence gaps do not. The output signal from the speech transmission system is preferably recorded (704) and analyzed to determine its quality, including temporal clipping (706). This analysis preferably includes comparing the output signal with a reference signal derived from the test signal using a cross correlation function. A processor (114) coupled to memory (116) records and analyzes the output signal.

19 Claims, 11 Drawing Sheets

U.S. PATENT DOCUMENTS

| | | | | |
|---|---|---|---|---|
| 6,631,339 | B2 * | 10/2003 | Poulsen et al. | 702/117 |
| 6,775,240 | B1 | 8/2004 | Zhang et al. | |
| 7,212,815 | B1 * | 5/2007 | Juric | 455/423 |

OTHER PUBLICATIONS

International Telecommunication Union, Transmission performance objectives applicable to end-to-end international connections, Sep. 1999.

International Telecommunication Union, Transmission planning for voiceband services over hybrid Internet/PSTN connections, Sep. 1999.

International Telecommunication Union, Perceptual evaluation of speech quality (PESQ): An objective method for end-to-end speech quality assessment of narrow-band telephone networks and speech codecs, Feb. 2001.

* cited by examiner

METHOD AND APPARATUS FOR MEASURING THE QUALITY OF SPEECH TRANSMISSIONS THAT USE SPEECH COMPRESSION

FIELD OF THE INVENTION

The present invention relates generally to speech transmission, and in particular, to a method and apparatus for measuring the quality of speech transmissions that use speech compression devices, such as low-bit-rate vocoders.

BACKGROUND OF THE INVENTION

Vocoders are widely used for speech compression in wireless communications systems. In addition, vocoders are used in voice over IP (VoIP) networks and other applications. Using speech analysis and synthesis with linear predictive coding (LPC) and vocal model based quantization techniques, vocoders can significantly reduce the bit rate of a voice channel. A typical low bit rate vocoder, such as ITU-T recommendation G.729, has a bit rate of eight kilobits per second (kbps), which is ⅛ of the 64 kilobits per second rate needed to implement the ITU-T recommendation G.711 codec. The G.711 codec is normally used in the public switched telephone network (PSTN). Though most state-of-the-art vocoders introduce acceptable impairments in perceptual voice quality, the nonlinear processing of speech coding causes such a large change in the speech waveform that it becomes difficult to correlate an input speech waveform to an output speech waveform that has been processed by a vocoder. The waveform of reproduced speech is changed to such a degree that the signal-to-noise ratio almost becomes a useless parameter to measure the difference between a speech waveform before and after speech coding.

Temporal clipping is one kind of impairment that can degrade voice quality of a speech communications system. As used herein, temporal clipping refers to any discontinuity of a speech signal caused by either loss of the signal sent or insertion of a disrupting signal. FIG. 2 shows several graphical plots of signals in the time domain to illustrate common temporal clipping events. A reference signal is shown in plot 200. Plots 202, 204, and 206 show the reference signal corrupted due to front-end, back-end, and center temporal clipping, respectively. Plots 208 and 210 show the reference signal corrupted by skipping and pausing, respectively.

In the case of Internet voice, also known as VoIP, temporal clipping becomes a critical voice quality issue because, without guaranteed quality of service, packet loss, large delay, and jitter are inevitable. For this reason, ITU-T recommendations G.116 and G.117 specify requirements on temporal clipping. In packet networks like the Internet, temporal clipping may result from dropped added, skipped, or silence-suppressed packets.

With a speech transmission system using a conventional codec, such as ITU-T recommendation G.711, it is relatively easy to detect and measure temporal clipping. Commonly, temporal clipping is detected and measured by sending an input signal through a speech transmission system and comparing a delayed version of that input signal with the signal that is output from the speech transmission system, where the delay represents the time to travel through the transmission system. Indeed there are several databases of speech signals commonly used to detect and measure temporal clipping in systems employing conventional codecs. However, due to the acceptable waveform change produced by low bit rate vocoders, it is difficult to detect and measure temporal clipping in speech transmission systems using such vocoders in a similar manner. Also, the silence suppression techniques employed in speech transmission systems employing vocoders make a direct comparison between the input and the output more difficult.

Therefore, a need exists for a method and apparatus to accurately detect and measure quality, including temporal clipping, delay and jitter, in speech transmission systems employing compression.

SUMMARY OF THE INVENTION

The need is met and an advance in the art is made by the present invention, which provides a method and apparatus for determining the quality of a speech transmission, including temporal clipping, delay and jitter, using a carefully constructed test sequence and digital signal processing techniques.

According to the method, a test signal that is to be transmitted through a speech transmission system is created. Then the test signal is transmitted through the speech transmission system such that the speech transmission system creates an output signal that corresponds to the input signal, as modified by the speech transmission system. The test signal includes multiple segments of speech signals interleaved with periods of silence. The periods of silence vary in duration according to a predefined pattern. Each segment of speech signals includes multiple predefined speech samples or symbols interleaved with a plurality of silence gaps of differing duration. The silence gaps fall between adjacent speech samples. The speech samples have a common period of duration, and preferably a normalized power level.

The output signal from the speech transmission system is preferably recorded and analyzed to determine its quality, including temporal clipping. This analysis preferably includes comparing the output signal with a reference signal derived from the test signal using a cross correlation function. A processor coupled to memory records and analyzes the output signal.

FIGS. **8*a*-8*d*** are a flow chart illustrating a preferred method for comparing an output signal from a speech transmission system with a reference signal in accordance with the present invention.

DETAILED DESCRIPTION OF THE PREFERRED EMBODIMENTS

Figure 1:
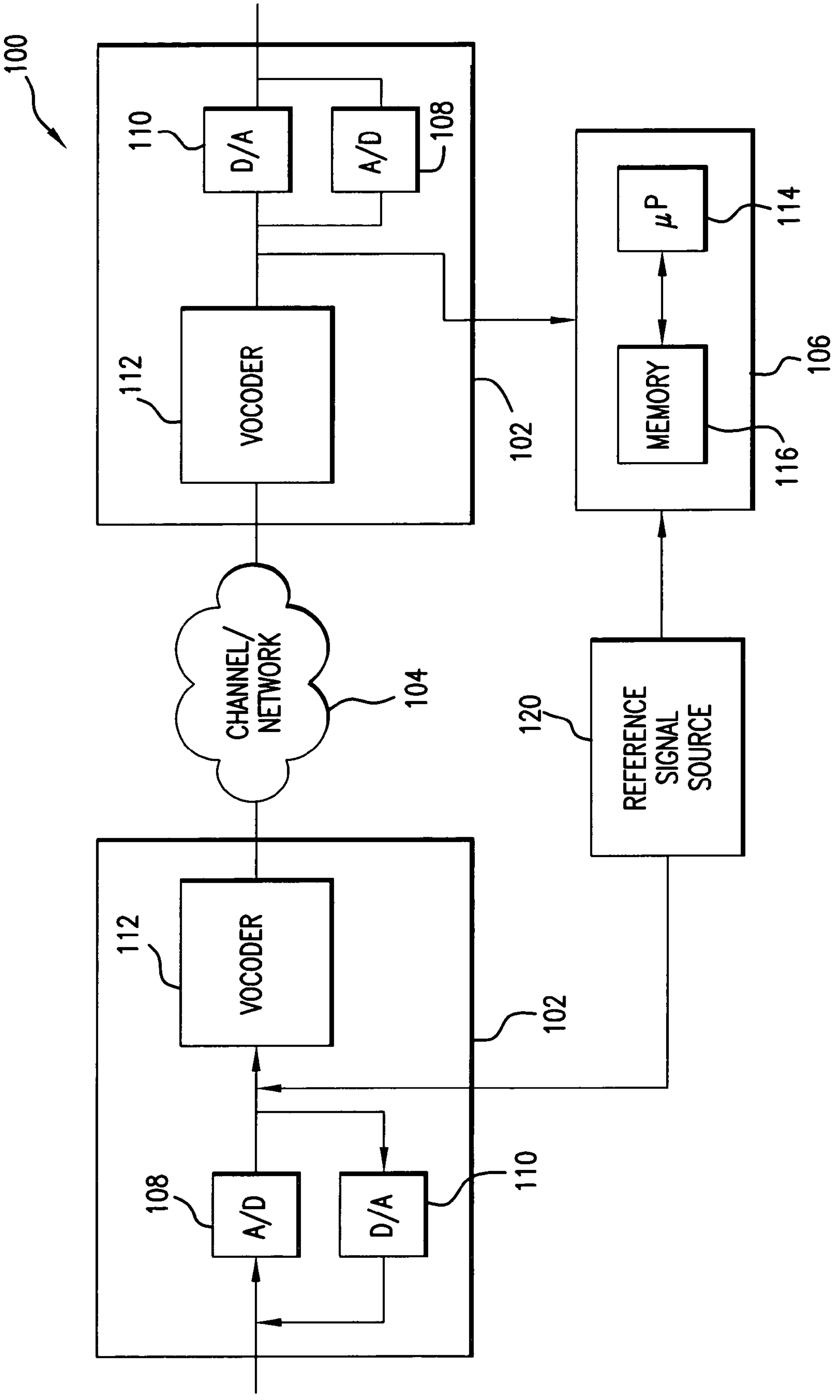
FIG. 1 is a block diagram of a preferred embodiment of a speech transmission system in accordance with the present invention.
Figure 2:
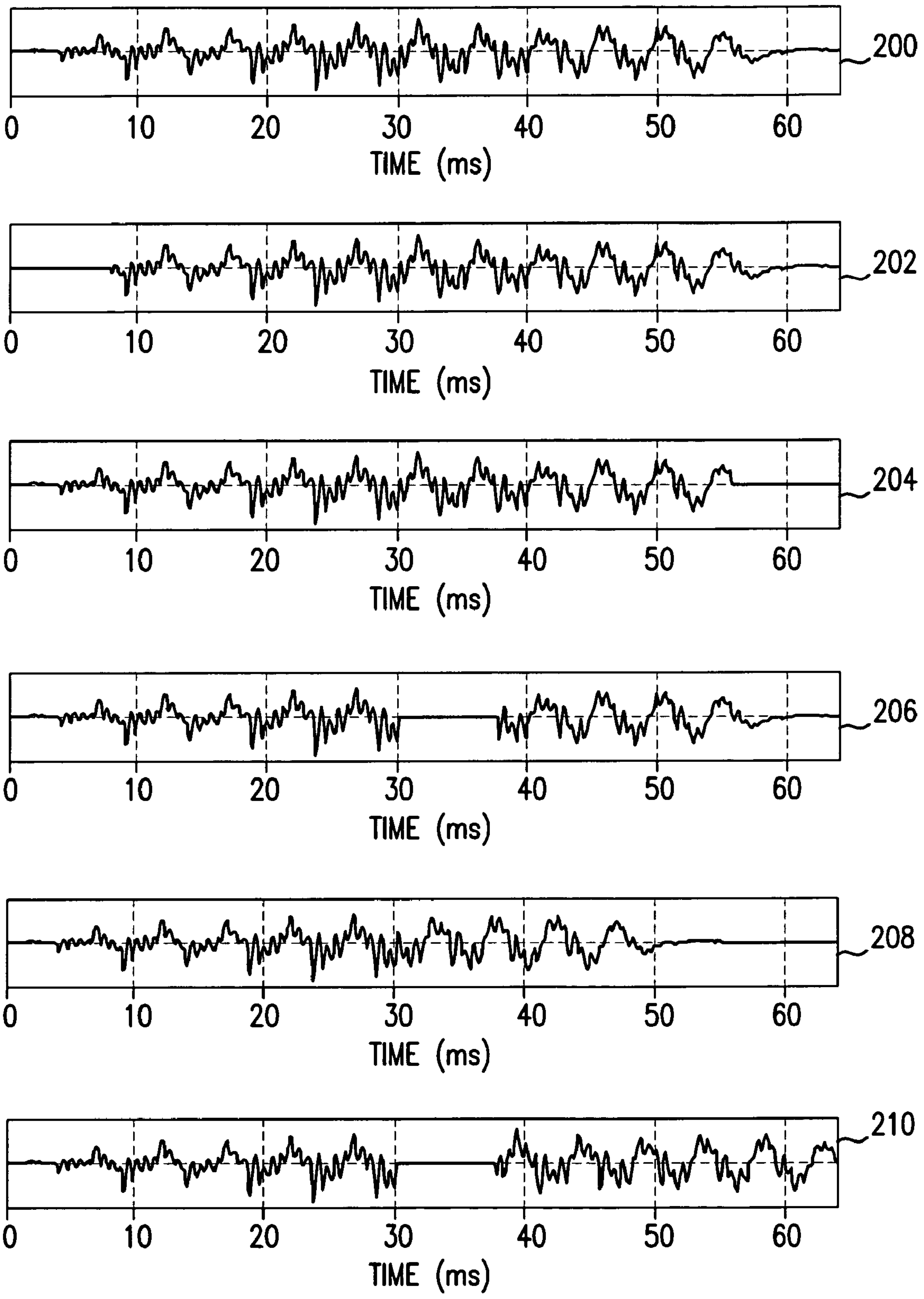
FIG. 2 is a collection of signal plots showing examples of temporal clipping events.

FIG. 1 is a block diagram of an exemplary speech transmission system 100 with the capability to determine the quality of speech transmissions, including temporal clipping, delay and jitter, in accordance with the present invention. Speech transmission system 100 includes two speech compression subsystems 102 interconnected by a channel/network element 104. A signal processor 106 is coupled to one speech compression subsystem 102 to determine quality of speech transmissions in accordance with the present invention. A reference signal source 120 applies a test signal into the system and supplies as a reference input to signal processor 106.

Each speech compression subsystem 102 preferably includes an analog-to-digital converter 108, a digital-to-analog converter 110, and a vocoder 112. For transmitting speech signals, analog-to-digital converter 108 receives an analog speech signal and converts it to a digital form. The speech in digital form is received by vocoder 112. Vocoder 112 uses an algorithm to compress the speech in digital form to another digital form, the new digital form preferably requiring less digital data. This reduced digital data is then preferably transferred over channel/network element 104 to the other speech compression subsystem 102. For receiving compressed speech signals, vocoder 112 receives digital speech signals from channel/network 104. Vocoder 112 converts these compressed digital speech signals into a digital format suitable for digital-to-analog converter 110. The digital format suitable for the digital-to-analog converter 110 typically includes more data than the compressed speech signals. Digital-to-analog converter 110 converts the digital speech signals into an analog speech signal.

Speech compression subsystem 102 is preferably a VoIP phone. Alternatively, speech compression subsystem 102 is any device that converts speech to a compressed digital format, including, for example, wireless telephones, switching systems and the like. Vocoder 112 is preferably a low-bit-rate vocoder, such as a vocoder specified by ITU-T recommendation G.729. Alternatively, vocoder 112 is any speech or audio compression device. Channel/network element 104 is any channel or network. Preferably, channel/network 104 is a packet based network such as the Internet.

Reference source 120 preferably inserts a linear PCM formatted test signal into vocoder 112. This signal then passes through the system and is received by signal processor 106. Any suitable signal source may be used for reference source 120, including a processor-based signal source.

Signal processor 106 is preferably coupled to speech compression subsystem 102 to receive digital speech data. Most preferably, signal processor 106 receives digital speech in a linear PCM format. In accordance with the present invention, as discussed further below, signal processor 106 stores and analyzes digital speech data received from speech compression subsystem 102. Signal processor 106 preferably includes a processor 114 coupled to a memory 116. Processor 114 and memory 116 perform signal processing operations on digital speech data received by signal processor 106 in accordance with the present invention. Processor 114 is preferably one or more microprocessors or digital signal processors. Memory 116 is any suitable device or devices for storing digital data.

Figure 3:
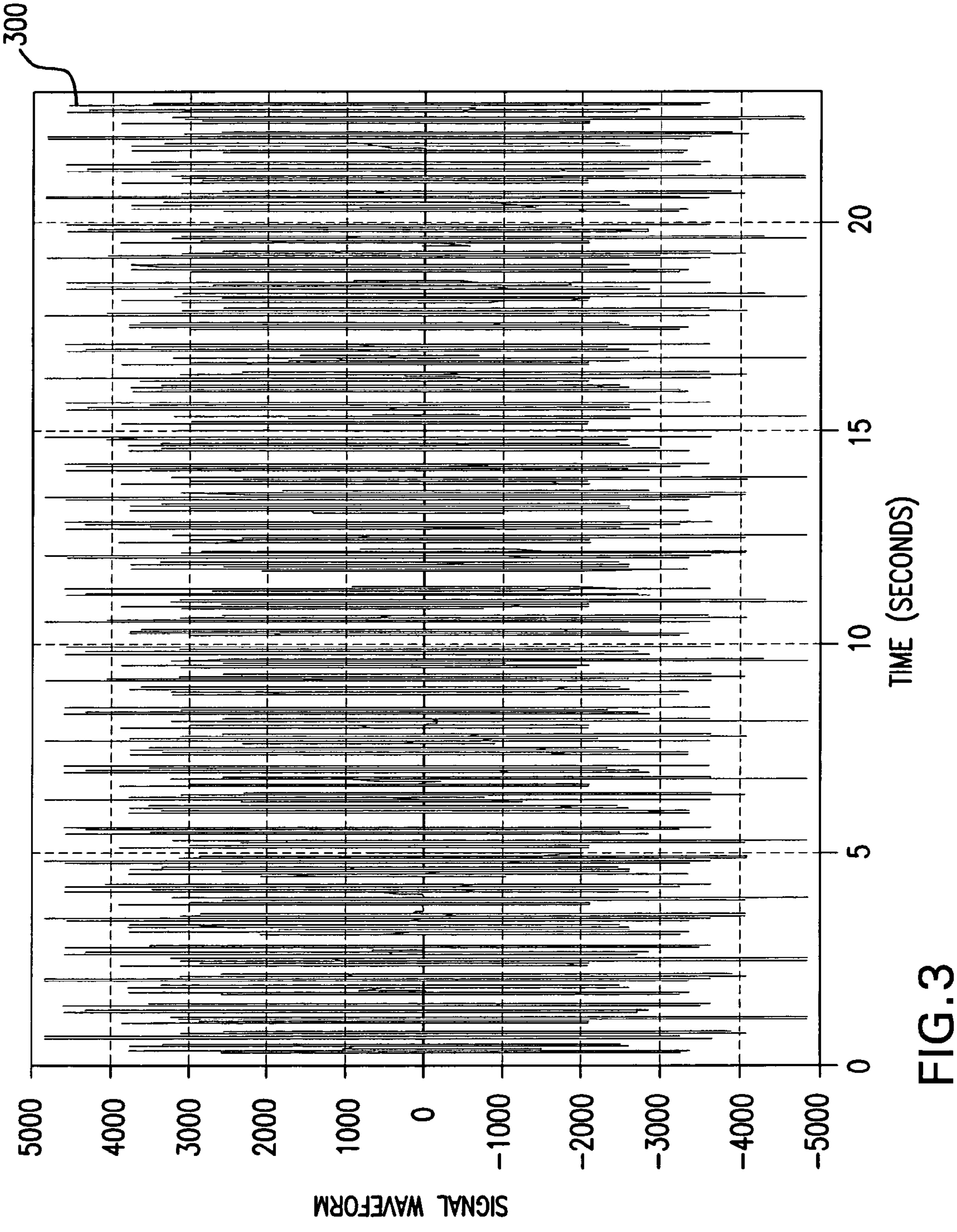
FIG. 3 is a plot of a preferred test signal in accordance with the present invention.

FIG. 3 is a graph of a preferred test signal 300 generated in accordance with the present invention. Test signal 300 is plotted in FIG. 3 with time on the x-axis and signal amplitude on the y-axis. Test signal 300 preferably has a finite number of speech symbols or samples of a fixed duration. The speech symbols are repeated throughout the test signal and interleaved with periods of silence that vary in duration. The preferred test signal 300 is approximately 23 seconds in length. The preferred test signal is normalized to −20 dbm or alternatively, −10 dbm.

Figure 4:
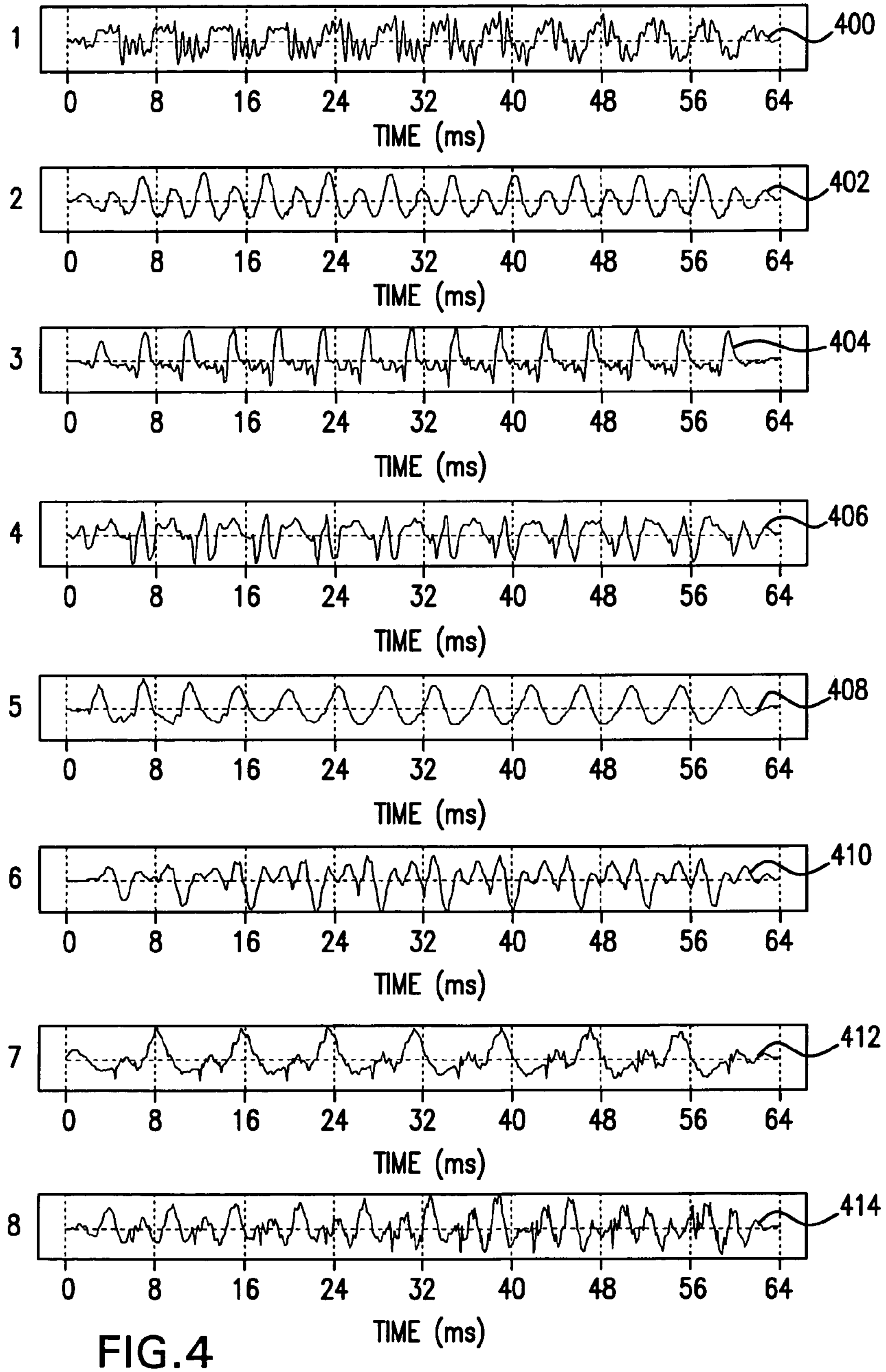
FIG. 4 is a collection of plots showing preferred speech samples or symbols used in the test signal shown in FIG. 3.

FIG. 4 shows eight preferred speech symbols or samples 400, 402, 404, 406, 408, 410, 412, 414 that are repeated throughout preferred test signal 300. The eight preferred symbols are preferably portions of speech signals or artificial signals that, when transmitted through a low-bit-rate vocoder, do not encounter significant amplitude and phase distortion of their frequency components. This allows good correlation between the pre-vocoded sample and the post-vocoded sample.

Preferably, speech samples 400, 402, 404, 406, 408, 410, 412, and 414 are 64 milliseconds (ms) in length. The length of the samples is chosen to be long enough to cover two frames or more of speech as generated by the typical codec. It is not desirable to make the symbols much longer than this because it unnecessarily lengthens the test signal and could introduce lower frequencies that encounter "distortion" with respect to the time domain waveform. Speech samples that are too short are not desirable because they are subject to a transient response. Also, the speech samples should not be less than the time equivalent of the size of a typical packet. Packets typically include 10 to 20 ms of data. Since a typical codec frame is 30 milliseconds, 64 milliseconds is chosen as the preferred length of the sample.

The eight preferred samples are chosen to be as orthogonal as possible. That is, the samples are chosen so that they do not look similar in the time domain. This is important to assure low cross correlation, which otherwise could cause misidentification of a received symbol or sample. The symbols are also chosen to avoid silence suppression within the sample. In a typical vocoder, if the energy of a signal falls below a threshold, the vocoder may substitute a silence frame instead of encoding the frame. This will "corrupt" or change the output waveform and reduce correlation between an input waveform and an output waveform. Therefore, the preferred samples do not include sustained intervals of silence or low amplitude. The eight preferred samples shown in FIG. 4 were chosen empirically with the above criteria in mind.

Figure 5:
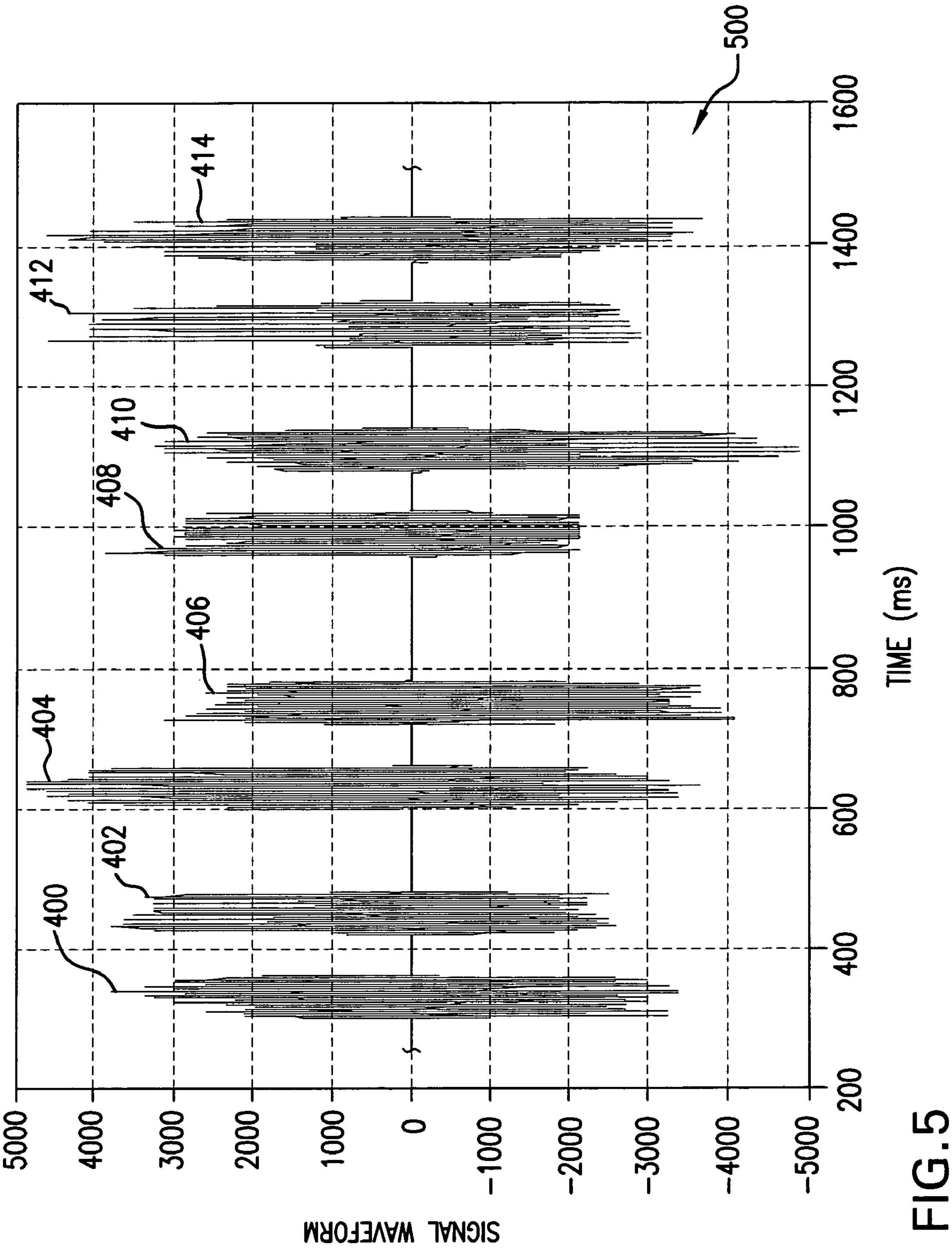
FIG. 5 is plot of a preferred segment of the test signal shown in FIG. 3.

FIG. 5 shows a plot of a preferred segment 500 of test signal 300. Segment 500 includes the eight preferred samples 400, 402, 404, 406, 408, 410, 412 and 414 with silence gaps interleaved between the samples. That is, adjacent samples are separated from each other by a silence gap. Most preferably, segment 500 includes one occurrence of each of the eight preferred samples and the silence gaps between the samples are 60 ms, 120 ms, 60 ms, 180 ms, 60 ms, 120 ms, and 60 ms, respectively. The silence gaps within segment 500 are chosen to be at least about the size of a speech sample. This means at least a couple of codec frames of silence are encountered. All the silence gaps in the segment 500 may be the same. But preferably the silence gaps vary as a multiple of the minimum gap. This variation allows less computation resources to locate predefined locations in segment 500.

More or less than eight samples may be used in segment 500. Eight samples provides a reasonable measurement limit. More samples, while theoretically desirable, may have an adverse effect on the correlation between samples. Less samples may require additional intervals of silence in the total test signal to retain pattern uniqueness. The more silence in the test waveform, the longer a test may need to be run to accurately determine performance. Therefore, at least four (4) samples is preferred, with eight (8) samples being the most preferred.

To form preferred test signal 300, sixteen segments 500 are interleaved with silence gaps or periods of silence. Most preferably, a period of silence is placed between adjacent segments 500. The periods of silence preferably vary in duration. This variance in duration allows for determining a unique point in the entire test signal, even though there are only eight speech samples repeated many times in the test signal. In the preferred test signal 300, the periods of silence between the sixteen segments are 240 ms, 300 ms, 240 ms, 360 ms, 240 ms, 300 ms, 240 ms, 420 ms, 240 ms, 300 ms, 240 ms, 360 ms, 240 ms, 300 ms, and 240 ms, respectively. This arrangement allows about one-third of the test signal 300 to include speech signals.

Figure 6:
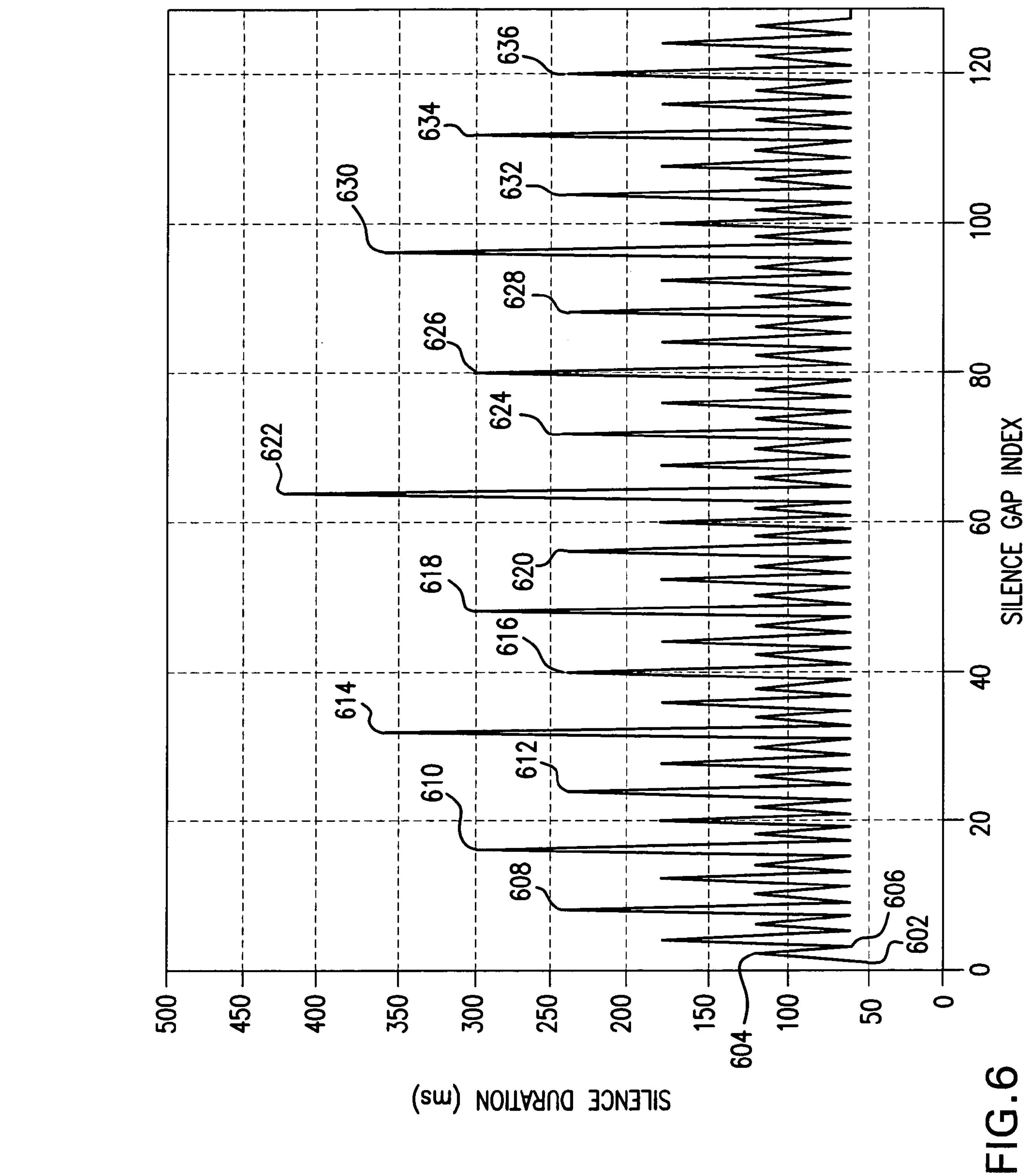
FIG. 6 is a graph showing the preferred durations of the silence periods of the test signal shown in FIG. 3.

FIG. 6 is a plot of each silence gap in the test signal, including both the silence gaps within a segment and the silence gaps between segments. The y-axis is the silence duration in milliseconds. Point 602 is the first silence gap between the first sample 400 and the second sample 402. Therefore, point 602 is at 60 ms. Point 604 is the silence gap between second sample 402 and third sample 404 and is at 120 ms. Point 606 is the 60 ms silence gap between third sample 404 and fourth sample 406. The first silence gap between segments 500 is at point 608. This gap is 240 ms. The silence gap between the second segment 500 and the third segment 500 is point 610 at 300 ms. All 127 silence gaps in preferred test signal 300 are plotted in FIG. 6.

The silence gaps in test signal 300 define a distinct pattern, as illustrated in FIG. 6. The pattern may be used as a framing pattern, much like the framing pattern in a transmission signal. Preferably, the silence gaps between segments 500 are chosen to be larger and preferably a multiple of the minimum silence gap between any two samples. The preferred overall length of test signal 300 is 23 seconds. This length, which somewhat determines the number of segments 500 used in the test signal, must be sufficiently long to measure system delay through the entire system under test.

For a packet-based speech transmission system, a comparison between a reference signal and a version of the test signal after transmission through the speech transmission system readily permits the detection of added packets or missing packets. Additional packets or the absence of packets may occur in either the speech samples or the silence gaps. The alternation between speech samples and silence gaps gives reference points by which to determine if a portion of the signal has been lost or added. The varying lengths of the silence gaps gives a long test signal with many reference points. By pattern matching to the reference points and the sequential pattern forming the segments, time added or dropped from the test pattern may be determined. If the packet size, in terms of time, is known, then the time difference can be expressed as the number of lost or gained packets. Substitution of packets may be determined for the portion of the test signal 300 comprising speech samples. This is detected, for example, by cross correlation between the reference signal speech samples and the speech samples received at the signal processor. Jitter can cause the addition or subtraction of packets. Jitter is the difference in delay as measured at a multitude of reference points. Too much system jitter results in lost, duplicated or silence-substituted packets due to buffer overflow/underflow. Delay may be determined by comparing input time to output time for corresponding portions of the transmitted test signal. Synchronization is generally required for absolute delay calculation. A preferred method for synchronization is disclosed in U.S. Pat. No. 6,775,240, which is hereby incorporated by reference.

Figure 7:
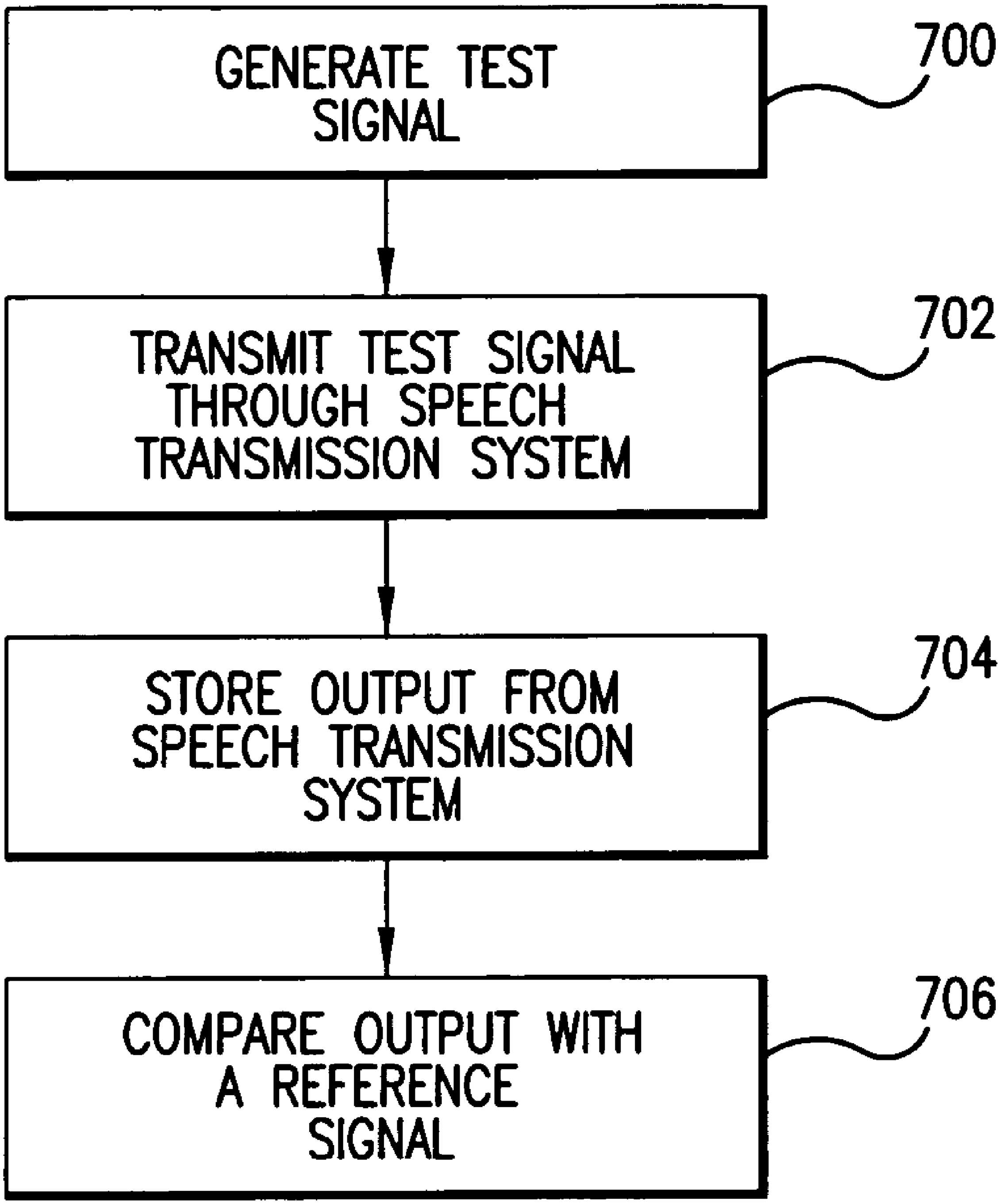
FIG. 7 is a flow chart illustrating a method for determining the quality of a speech transmission system in accordance with the present invention.
Figure 8A:
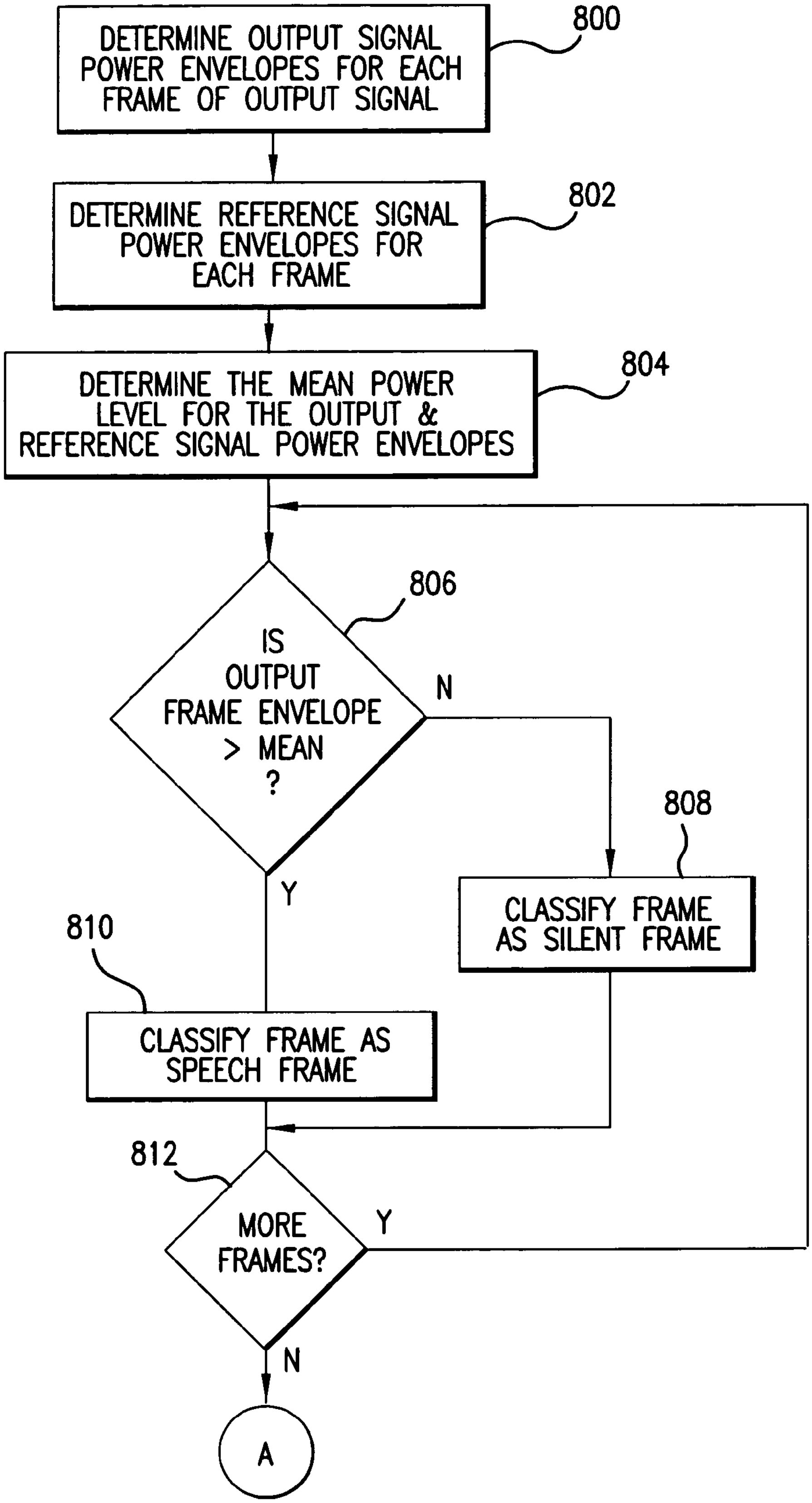
Figure 8B:
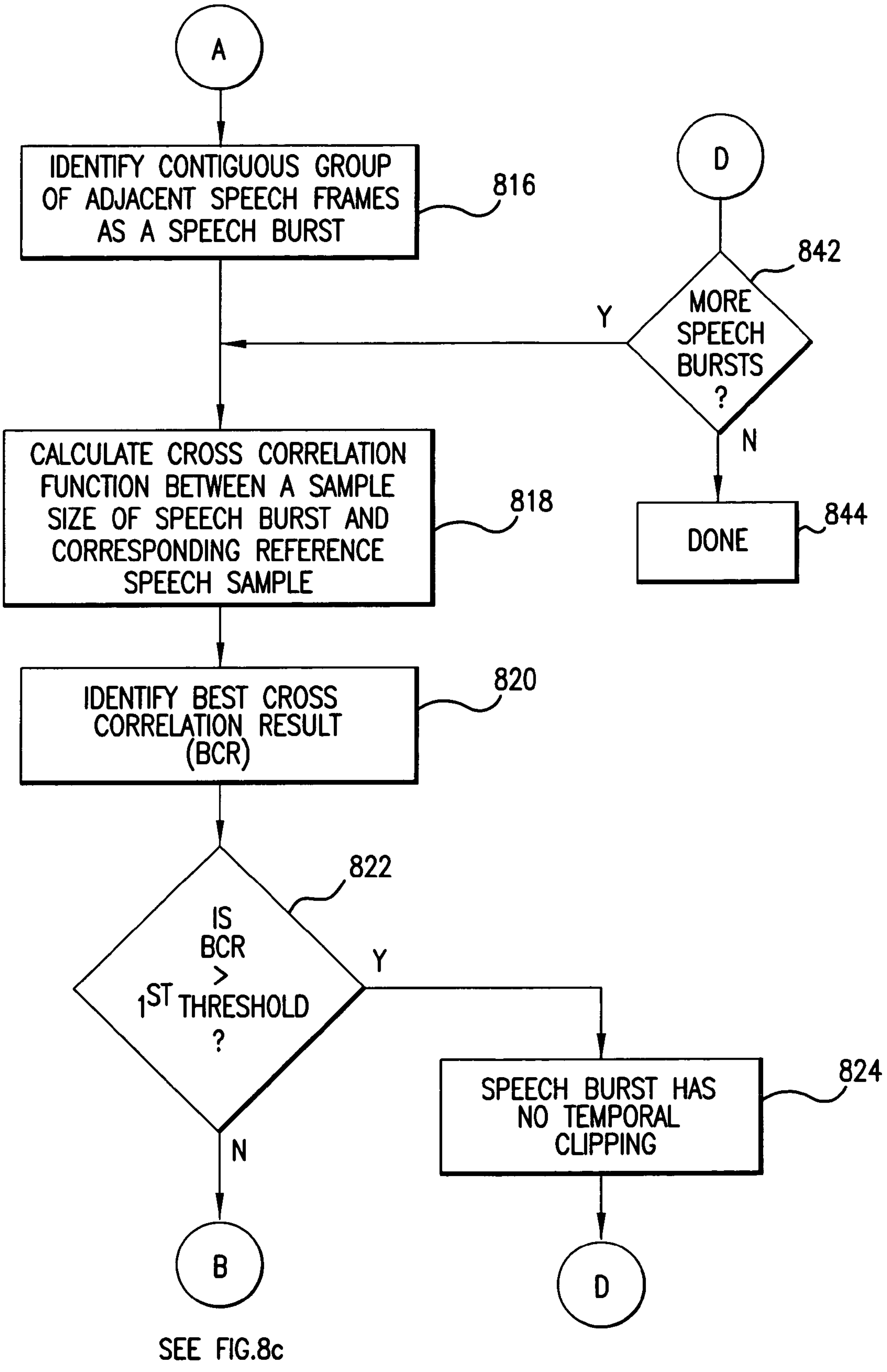
Figure 8C:
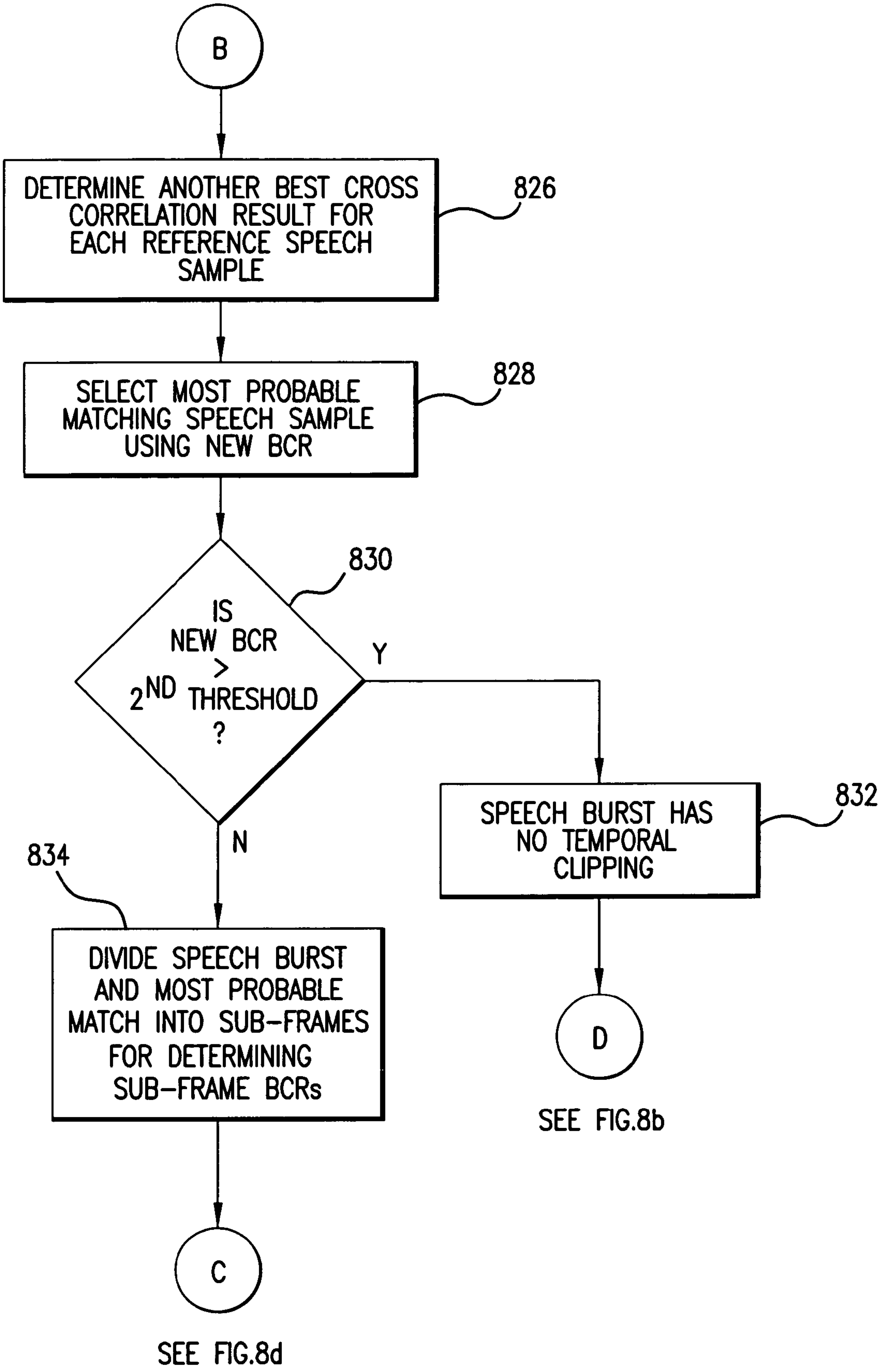
Figure 8D:
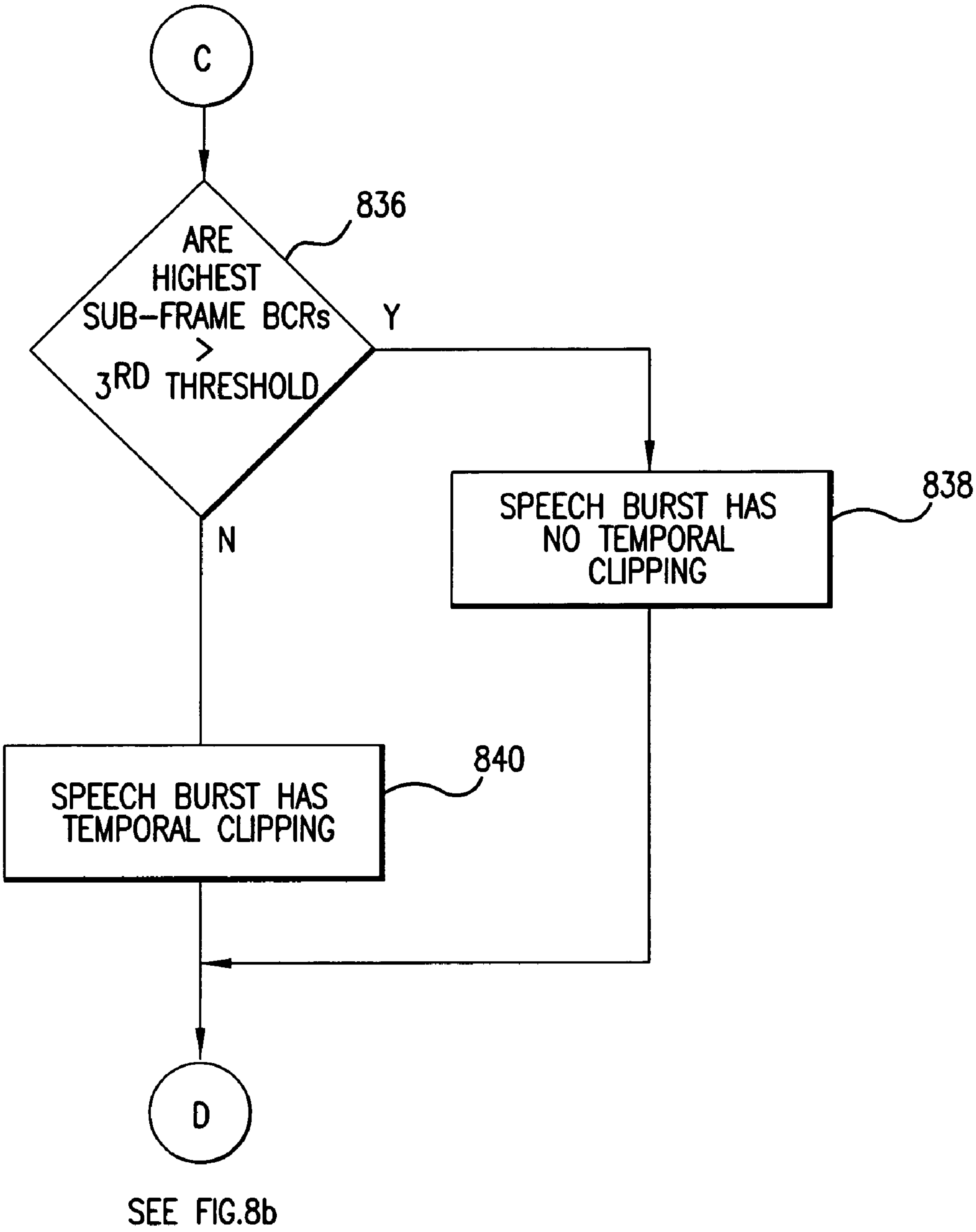

A preferred method for analyzing a test signal after transmission through a speech transmission system is illustrated by the flow chart in FIG. 7. First a test signal is generated (700). The test signal preferably has the characteristics of test signal 300, including ascertainable points of reference, sample signals that are not corrupted by a vocoder, and adequate length to measure delay. The test signal is then transmitted through the speech transmission system under observation (702). The output resulting from the transmission of the test signal through the speech transmission system under observation is stored (704). Finally, this output is compared to a reference signal (706). The reference signal is preferably the test signal as modified by a vocoder(s) using an algorithm similar to the algorithm used by the speech transmission system under observation. However, this makes the reference signal vocoder dependent. Preferably, for vocoder-independent testing, the reference signal is the test signal without channel corruption or packet loss or addition. The reference signal is preferably generated by reference signal source 120, which may be a processor, like speech processor 106. The reference signal and output signal are compared using pattern matching, cross correlation and the energy of the signal.

FIGS. **8*a*-8*d* illustrate a preferred method for comparing the reference signal with the output signal of a speech transmission system, including the determination of whether there is temporal clipping. The method is preferably performed by signal processor 106 using a stored program. A first step in the method is to determine power envelopes over the output signal for a predetermined frame size (800). The preferred frame size for this calculation is 30 ms. Similarly, power envelopes are calculated for the reference signal for the predetermined frame size, preferably 30 ms (802). Then the mean power levels of the power envelopes are calculated for the output signal and the reference signal power envelopes (804). Then each output signal frame's power level is compared against the mean power level (806). If a frame's power level is not greater than the mean level (806), then the frame is classified as a silence frame (808). On the other hand, if a frame's power level is greater than the mean level (806), then the frame is classified as a speech frame (810). This frame classification continues until all frames are classified (812**).

After all the frames are classified as speech frames or silent frames, contiguous adjacent speech frames are grouped as a speech burst (816). Similarly, the adjacent silent frames form silence periods of a certain duration. Depending on the frame size, in determining speech bursts, a silent frame between two speech frames may be ignored. That is, those two speech frames will be considered part of the same speech burst. In other words, the speech frames forming a speech burst may be substantially contiguous, allowing for a small silence gap. Using the duration pattern of the silence periods in the reference signal, the speech burst are approximately aligned with the corresponding speech samples in the reference signal. This permits a coarse delay estimate for each speech burst in the output signal as the difference between the energy center of the speech bursts and the energy center of the corresponding speech sample in the reference signal. Differences in delay for speech burst pairs are an indication of system timing jitter.

For a determination of whether there is temporal clipping and also for finer delay estimation, the method continues as follows. For each speech burst, a cross correlation function is calculated between two frames of a predetermined size (818). The frame size chosen is preferably the size of the speech samples, in the preferred case, 64 ms. One frame used for the cross correlation function is the frame centered around the energy center of the speech burst. The other frame is the corresponding speech sample or symbol in the reference signal. The best cross correlation result is selected as the peak of the cross correlation function, i.e., the maximum result from the series produced by the cross correlation function (820). If the best cross correlation result (BCR) is greater than a predefined threshold (822), then a good match between the speech burst and the corresponding speech symbol is found and there is no temporal clipping for that speech burst (824). A preferred threshold for this determination is 0.9.

If the BCR is not greater than the predetermined threshold (822), then a finer search is performed. For this finer search, seven additional best cross correlation results are calculated, one for each alternative speech sample (826). These additional best cross correlation results are calculated between the speech burst and each alternative reference speech sample. The speech sample giving the highest of these additional best cross correlation results is considered the most probable match for the speech burst (828). If this highest or maximum best cross correlation result is greater than another predefined threshold (830), then the most probable match speech sample is considered a good match and that speech burst has no temporal clipping. However, this additional search away from the assumed reference point indicates that one or more other symbols were likely lost, and suffered temporal clipping, which can be determined from the expected test pattern by noting where the received signal departs from the pattern. The predefined threshold for this search is preferably 0.9.

A finer delay estimate for each speech burst is calculated if a good match is found (824, 832). This finer delay estimate is the difference between the temporal peak of the speech burst, as determined by the BCR (820, 826), and the energy center of the "best" match speech sample in the reference signal. Finer jitter measurements are possible using the temporal peaks determined by the BCR (820, 826).

If none of the maximum best cross correlation results is greater than the predefined threshold (830), then yet another search is performed to determine if there was a temporal clipping in the speech burst.

For this additional search the speech burst is subdivided into sub-frames of a predetermined size (834). And, the most probable match speech sample is also subdivided into sub-frames of the same predetermined size (834). The sub-frames are preferably sized to be 8 ms. Cross correlation functions are calculated between each sub-frame of the speech burst and each sub-frame of the most probable match speech sample. This results in a set of cross correlation results for each sub-frame of the speech burst. The peaks of the cross correlation results are analyzed to determine if the results suggest a most probable alignment or arrangement of the speech burst sub-frames with respect to the sub-frames of the most probable match speech sample. This analysis is preferably done manually, but may also be done by a program or automatically. After a most probable alignment is determined, if the best cross correlation results that correspond to that alignment all exceed a predefined threshold (836), then the speech burst is considered good and there is no temporal clipping event (838). The preferred predefined threshold for this determination is 0.5 to 0.9. If on the other hand, all the best cross correlation results that correspond to the most probable alignment are not greater than the predefined threshold (836), then the speech burst is classified as corrupt and a temporal clipping event is detected (840). The cross correlation function results for the sub-frames of the speech burst and the sub-frames of the most probable match speech sample may reveal the nature of the temporal clipping event. For example, in the preferred embodiment using 8 ms sub-frame sizes, if six of the eight best cross correlation results corresponding to a particular alignment are greater than 0.9, then there may be a 16 ms temporal clipping event.

This process described above is repeated for each speech burst in the output signal (842, 844).

According to the present invention, a method and apparatus are provided to determine quality of a speech transmission for a transmission system employing compression, for example, using a vocoder. A test signal is constructed to allow comparing of an output signal from the speech transmission with a reference signal. This comparison is effective, in spite of the acceptable waveshape change in an output signal introduced by compression. The test signal, in combination with signal processing techniques performed by a signal processor, permits the accurate detection of delay, jitter, and temporal clipping events.

Whereas the present invention has been described with respect to specific embodiments thereof, it will be understood that various changes and modifications will be suggested to one skilled in the art and it is intended that the invention encompass such changes and modifications as fall within the scope of the appended claim.

The invention claimed is:

1. A method for determining the quality of a speech transmission processed by a speech transmission system, the method comprising the steps of:

creating a test signal to be transmitted through the speech transmission system;

transmitting the test signal through the speech transmission system, wherein the speech transmission system includes a vocoder and wherein the speech transmission system uses the vocoder to create an output signal that corresponds to the test signal as modified by the speech transmission system;

wherein the test signal comprises:

a plurality of segments of speech signals interleaved with a plurality of periods of silence, wherein between adjacent segments of the plurality of segments there is a period of silence of the plurality of periods of silence;

wherein each segment of the plurality of segments comprises a plurality of speech samples interleaved with a plurality of silence gaps, wherein there is a silence gap of the plurality of silence gaps between adjacent speech samples of the plurality of speech samples, wherein each speech sample of the plurality of speech samples has a first predefined duration;

wherein the plurality of silence gaps do not all have a same duration;

wherein the plurality of periods of silence do not all have a same duration; and wherein the first predefined duration is a function of a packet size associated with the speech transmission system.

2. The method of claim 1 wherein each speech sample of the plurality of speech samples has a normalized power level.

3. The method of claim 1 further comprising the steps of:

storing the output signal;

comparing the output signal to a reference signal, wherein the reference signal is the test signal.

4. The method of claim 3 wherein the comparing step further comprises the steps of determining a first delay estimate by aligning a portion of the output signal with a corresponding speech sample in the reference signal and computing a difference in time between an energy center of the portion of the output signal and an energy center of a corresponding speech sample in the reference signal.

5. The method of claim 4 wherein the predetermined frame size is about 30 milliseconds.

6. The method of claim 4 wherein aligning a portion of the output signal with a corresponding speech sample in the reference signal includes the steps of:

determining a plurality of output signal power envelopes, wherein each output signal power envelope of the plurality of output signal power envelopes is a power envelope for each interval of a predetermined frame size of the output signal;

determining a plurality of reference signal power envelopes, wherein each reference signal power envelope of the plurality of reference signal power envelopes is a power envelope for each interval of the predetermined frame size of the reference signal;

determining a mean power level for each output signal power envelope and a mean power level for each reference signal power envelope;

classifying each interval of the predetermined frame size of the output signal as a speech frame or a silence frame based on the mean power level for each output signal power envelope, wherein a plurality of silence frames and a plurality of speech frames are determined and wherein a contiguous group of adjacent speech frames is classified as a speech burst; and aligning each speech burst in the output signal with a corresponding speech sample in the reference signal by using a duration pattern made by the plurality of silence frames.

7. The method of claim 6 wherein the comparing step further comprises the steps of:

for each speech burst, determining a cross correlation function between a first frame and a second frame, wherein the first frame has the first predefined duration and a center point for the first frame is selected as an energy center of the speech burst, and wherein the second frame is a corresponding speech sample in the reference signal;

identifying a best cross correlation result as a peak of the cross correlation function; and if the best cross correlation result is greater than a first predetermined threshold, then classifying the speech burst as one without temporal clipping.

8. The method of claim 7 wherein if the highest additional best cross correlation result is not greater than the second predetermined threshold, then:

comparing the speech sample corresponding to the highest additional best cross correlation result with the speech burst by:

dividing the speech sample corresponding to the highest additional best cross correlation result into sub-frame speech samples of a second predefined duration;

dividing the speech burst into sub-frame speech burst of the second predefined duration;

for each sub-frame speech burst, determining a sub-frame cross correlation function between each sub-frame speech burst and each sub-frame speech sample to determine a plurality of sub-frame best cross correlation results; and determining a most probable alignment of sub-frames of the speech burst with respect to sub-frames of the speech sample;

selecting a plurality of highest sub-frame best cross correlation results from the plurality of sub-frame best cross correlation results, wherein the plurality of highest sub-frame best cross correlation results corresponding to the most probable alignment of sub-frames of the speech burst; and if each highest sub-frame best cross correlation result of the plurality of highest sub-frame best cross correlation results is greater that a third predetermined threshold, then classifying the speech burst as one without temporal clipping; and if each highest sub-frame best cross correlation result is not greater than the third predetermined threshold, then classifying the speech burst as one with temporal clipping.

9. The method of claim 7 further comprising the steps of:

if the best cross correlation result is not greater than the first predetermined threshold, then for each speech sample of the plurality of speech samples determining an additional best cross correlation result by:

determining an additional cross correlation function between each speech sample and the speech burst and selecting the additional best cross correlation result as a peak of the additional cross correlation functions; and determining a speech sample of the plurality of speech samples is a most probable match, if that speech sample corresponds to a highest additional best cross correlation result; and classifying the speech burst as one without temporal clipping if the highest additional best cross correlation result is greater that a second predetermined threshold.

10. The method of claim 9 wherein if the best cross correlation result is greater than the first predetermined threshold or if the highest additional best cross correlation result is greater than the second predetermined threshold, then calculating a delay as the difference between one of a temporal peak of the best cross correlation result and a temporal peak of the highest cross correlation result and a corresponding point in the reference signal.

11. The method of claim 1 wherein the first predefined duration is a function of a frame size used for compression by the speech transmission system.

12. The method of claim 1 wherein the plurality of periods of silence and the plurality of silence gaps each have a duration that is a multiple of a duration of at least one of the plurality of silence gaps.

13. The method of claim 1 wherein the reference signal is a signal resulting from processing the test signal with a codec that uses an algorithm for coding that is the same as an algorithm used for coding in the speech transmission system.

14. An apparatus for determining quality of a speech transmission processed by a speech transmission system comprising:

a processor coupled to the speech transmission system;

a memory coupled to the processor to store the speech transmission;

wherein the processor stores an output signal from the speech transmission system;

compares the output signal to a reference signal, wherein the reference signal is a signal resulting from processing a test signal with a codec that uses an algorithm for coding that is the same as an algorithm used for coding in the speech transmission system;

wherein the test signal comprises:

a plurality of segments of speech signals interleaved with a plurality of periods of silence, wherein between adjacent segments of the plurality of segments there is a period of silence of the plurality of periods of silence;

wherein each segment of the plurality of segments comprises a plurality of speech samples interleaved with a plurality of silence gaps, wherein there is a silence gap of the plurality of silence gaps between adjacent speech samples of the plurality of speech samples, wherein each speech sample of the plurality of speech samples has a first predefined duration;

wherein the plurality of silence gaps do not all have a same duration;

wherein the plurality of periods of silence do not all have a same duration; and wherein the first predefined duration is a function of a packet size associated with the speech transmission system.

15. The apparatus of claim 14 wherein each speech sample of the plurality of speech samples has a normalized power level.

16. The apparatus of claim 14 wherein the plurality of speech samples are characterized by minimal distortion when coded by the speech transmission system.

17. The apparatus of claim 14 wherein the plurality of speech samples are selected to minimize a cross correlation between each other.

18. The apparatus of claim 14 wherein the plurality of speech samples are characterized by minimal periods of silence or low amplitude.

19. A method for determining the quality of a speech transmission processed by a speech transmission system, the method of comprising the steps of:

transmitting the test signal through the speech transmission system, wherein the speech transmission system includes a vocoder and wherein the speech transmission system uses the vocoder to create an output signal that corresponds to the test signal as modified by the speech transmission system;

wherein the test signal comprises:

a plurality of segments of speech signals interleaved with a plurality of periods of silence, wherein between adjacent segments of the plurality of segments there is a period of silence of the plurality of periods of silence;

wherein each segment of the plurality of segments comprises a plurality of speech samples interleaved with a plurality of silence gaps, wherein there is a silence gap of the plurality of silence gaps between adjacent speech samples of the plurality of speech samples, wherein each speech sample of the plurality of speech samples has a predefined duration;

wherein the plurality of silence gaps do not all have a same duration; and wherein the plurality of periods of silence do not all have a same duration; and wherein the predefined duration is a function of a packet size associated with the speech transmission system.

* * * * *